US012517696B2

(12) United States Patent
Nagata et al.

(10) Patent No.: US 12,517,696 B2
(45) Date of Patent: Jan. 6, 2026

(54) AUDIO DATA PROCESSING DEVICE, AUDIO DATA PROCESSING METHOD, AND PROGRAM

(71) Applicant: AlphaTheta Corporation, Yokohama (JP)

(72) Inventors: Yuu Nagata, Yokohama (JP); Nao Takagi, Yokohama (JP)

(73) Assignee: ALPHATHETA CORPORATION, Yokohama (JP)

( * ) Notice: Subject to any disclaimer, the term of this patent is extended or adjusted under 35 U.S.C. 154(b) by 90 days.

(21) Appl. No.: 18/683,905

(22) PCT Filed: Aug. 18, 2021

(86) PCT No.: PCT/JP2021/030155
§ 371 (c)(1),
(2) Date: Feb. 15, 2024

(87) PCT Pub. No.: WO2023/021603
PCT Pub. Date: Feb. 23, 2023

(65) Prior Publication Data
US 2024/0361978 A1   Oct. 31, 2024

(51) Int. Cl.
*G06F 3/16*   (2006.01)
(52) U.S. Cl.
CPC .............. *G06F 3/165* (2013.01); *G06F 3/162* (2013.01)
(58) Field of Classification Search
CPC ......... G11B 20/00; G11B 27/00; G11B 27/32; G10L 19/00; G10L 21/00; G06F 3/165; G06F 3/162
See application file for complete search history.

(56) References Cited

U.S. PATENT DOCUMENTS

| 6,199,076 B1 * | 3/2001 | Logan ................ H04N 21/6582 434/319 |
| 7,574,513 B2 * | 8/2009 | Dunning ................ G06Q 30/02 709/227 |
| 8,636,199 B1 | 1/2014 | Slayden et al. |

(Continued)

FOREIGN PATENT DOCUMENTS

| JP | 2012-012977 A | 1/2012 |
| JP | 2012-129977 A | 7/2012 |

(Continued)

OTHER PUBLICATIONS

Japanese Office Action dated Feb. 12, 2025 issued in corresponding Japanese application No. 2023-542080; English translation included; 6 pages.

(Continued)

*Primary Examiner* — Rasha S Al Aubaidi
(74) *Attorney, Agent, or Firm* — Rankin, Hill & Clark LLP

(57) ABSTRACT

An audio data processing device is provided including a player configured to play an audio data, a playing direction switcher configured to switch a playing direction of the audio data between a forward direction and a reverse direction in response to an operation signal, and a play effect selector configured to apply a first play effect to the audio data when the playing direction is the forward direction and configured to apply a second play effect different from the first play effect to the audio data when the playing direction is the reverse direction.

6 Claims, 13 Drawing Sheets

(56) References Cited

U.S. PATENT DOCUMENTS

2001/0017821 A1    8/2001    Inoue et al.
2010/0027388 A1    2/2010    Kudo et al.
2016/0216934 A1*   7/2016    Guy .................. G06F 3/165

FOREIGN PATENT DOCUMENTS

JP      2016-058123 A    4/2016
WO    2008/107949 A1   9/2008
WO    2019/239486 A1  12/2019

OTHER PUBLICATIONS

International Search Report dated Nov. 22, 2021, Application No. PCT/JP2021/030155; 4 pages.
International Preliminary Report on Patentability dated Feb. 13, 2024, Application No. PCT/JP2021/030155; 4 pages.
Japanese Notice of Allowance dated Aug. 5, 2025, Application No. 2023-542080; English translation included; 1 page.
US Office Action dated Nov. 5, 2025 issued in corresponding U.S. Appl. No. 18/683,902; 24 pages.

\* cited by examiner ated in the DJ controller illustrated in FIG.
AUDIO DATA PROCESSING DEVICE, AUDIO DATA PROCESSING METHOD, AND PROGRAM

TECHNICAL FIELD

The present invention relates to an audio data processing device, an audio data processing method, and a program.

BACKGROUND ART

As disclosed in, for instance, Patent Literature 1, there has been known a technique for providing information on how to master playing instruments to be played by a disc jockey (DJ) (e.g. a DJ player and a DJ controller).

CITATION LIST

Patent Literature(s)

Patent Literature 1: International Publication WO 2019/239486

SUMMARY OF THE INVENTION

Problem(s) to Be Solved by the Invention

One of typical playing techniques for such DJ instruments is scratching. The scratching is a technique for muting a music piece by manipulating a cross fader and changing playing sound volume while manipulating a turntable platter to shift a playing position of the music piece back and forth. The scratching requires that both of the turntable platter and the cross fader should be operated at appropriate operational amount and timing. Accordingly, it is not easy for, for instance, a beginner to master the scratching.

In view of the above, an object of the invention is to provide an audio data processing device, an audio data processing method, and a program that are capable of effectively assisting a practice for scratching in DJ instruments.

Means for Solving the Problem(s)

According to an aspect of the invention, there is provided an audio data processing device including: a player configured to play audio data; a playing sound volume controller configured to control a playing sound volume of the audio data in response to an operation signal; a time interval calculator configured to calculate a time interval of occurrences of a predetermined event in the operation signal; and a playing position controller configured to shift a playing position of the audio data to a predetermined position when the time interval is more than a threshold and configured to continue playing the audio data without shifting the playing position of the audio data when the time interval is not more than the threshold.

According to another aspect of the invention, there is provided an audio data processing method including: playing audio data; controlling a playing sound volume of the audio data in response to an operation signal; calculating a time interval of occurrences of a predetermined event in the operation signal; and shifting a playing position of the audio data to a predetermined position when the time interval is more than a threshold and continuing playing the audio data without shifting the playing position of the audio data when the time interval is not more than the threshold.

According to still another aspect of the invention, there is provided a program causing a computer to perform: a function for playing audio data; a function for controlling a playing sound volume of the audio data in response to an operation signal; a function for calculating a time interval of occurrences of a predetermined event in the operation signal; and a function for shifting a playing position of the audio data to a predetermined position when the time interval is more than a threshold and continuing playing the audio data without shifting the playing position of the audio data when the time interval is not more than the threshold.

DESCRIPTION OF EMBODIMENT(S)

The following describes preferred exemplary embodiments of the invention in detail with reference to the accompanying drawings. It is to be noted that, in this description and the accompanying drawings, components that have substantially the same functional configuration are indicated by the same reference signs, and thus redundant description thereof is omitted.

Figure 1:
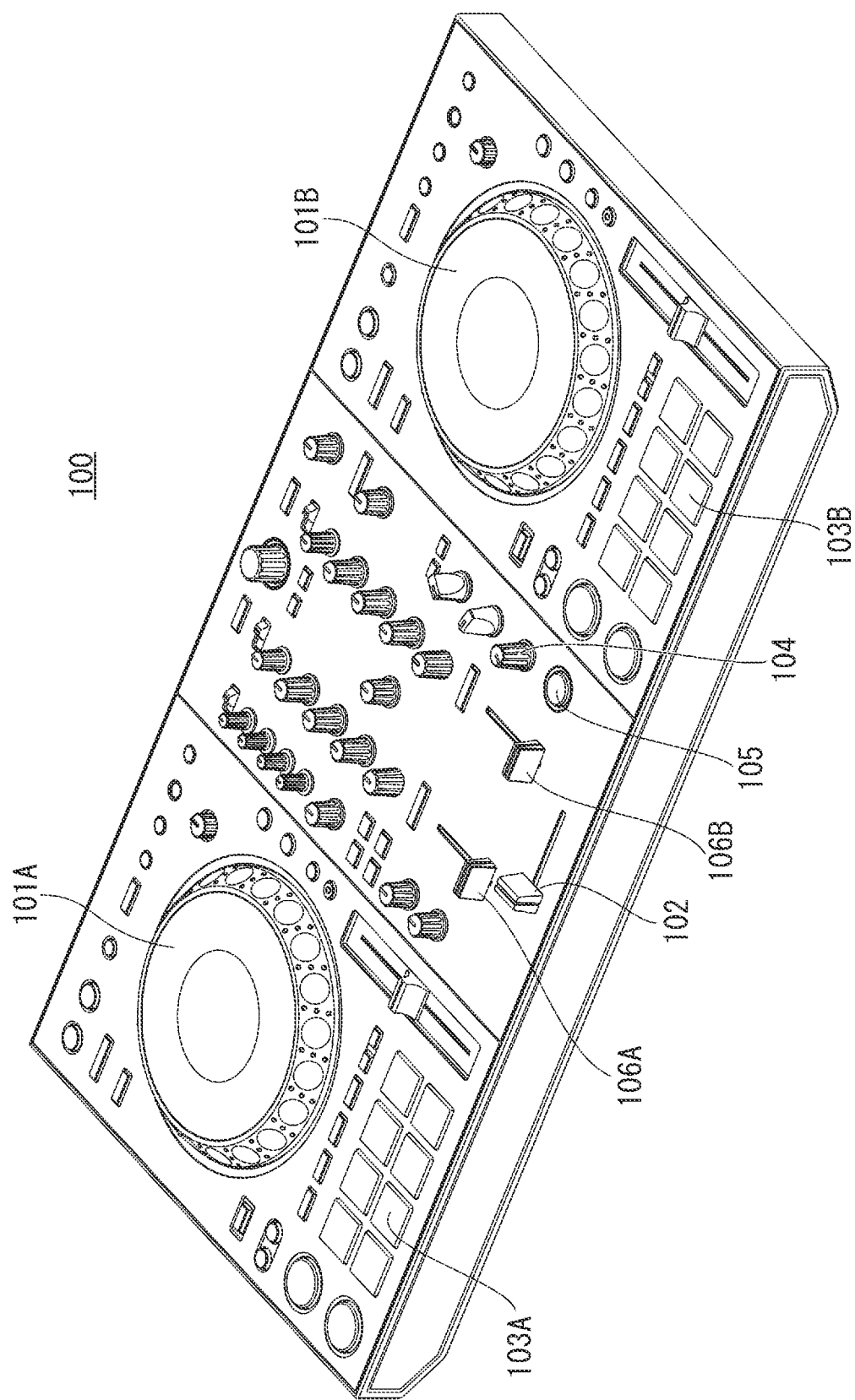
FIG. 1 depicts an overall structure of a DJ controller according to an exemplary embodiment of the invention.

FIG. 1 depicts an overall structure of a DJ controller according to an exemplary embodiment of the invention. A DJ controller 100 is an audio data processing device of the present exemplary embodiment and is configured to play a music piece using audio data imported from an outside. At this time, a user can control how the audio data is to be played and can apply various effects to the audio data to be played with a use of operators provided on the DJ controller 100. The operators are exemplified by turntable platters 101A, 101B, a cross fader 102, performance pads 103A, 103B, an effect adjustment knob 104, an effect activation button 105, and channel faders 106A, 106B.

In the above-described DJ controller 100, a first audio data is played using the turntable platter 101A, the performance pad 103A, and the channel fader 106A, and a second audio data is played using the turntable platter 101B, the performance pad 103B, and the channel fader 106B. The first audio data and the second audio data can be mutually independently played. In the following description, operating and processing systems for playing the first audio data and second audio data will be sometimes referred to as an A deck and a B deck, respectively. Meanwhile, some of the operators (e.g. the cross fader 102, the effect adjustment knob 104, and the effect activation button 105) are provided in common in the A deck and the B deck.

Mainly used ones for the scratching operation among the operators of the DJ controller 100 are the turntable platters 101A, 101B and the cross fader 102. The turntable platters 101A, 101B are operators for controlling the playing position of the audio data played by the A deck and the B deck, respectively. Specifically, a user can shift the playing position of the audio data forward and backward by rotating the turntable platter 101A (101B) (rotary operator) clockwise and anticlockwise, respectively. In the scratching, the audio data is repeatedly played in a forward direction (forward play) and a reverse direction (reverse play) through an operation for reversing the rotary direction of the turntable platter 101A (101B).

The cross fader 102 is an operator for controlling a balance between playing sound volumes of the first audio data and the second audio data. Specifically, a ratio between the playing sound volumes of the A deck and the B deck becomes A:B=100:0 when the cross fader 102 is located at an end near the A deck, whereas the ratio between the playing sound volumes becomes A:B=0:100 when the cross fader 102 is located at an end near the B deck. In the scratching, the cross fader 102 is repeatedly operated to mute one of the decks to be scratched, that is, the cross fader 102 is repeatedly operated to temporarily set the playing sound volume to zero to cut off the sound. It should be noted that the components of the DJ controller 100 other than the below-described audio data processing function (including the turntable platters 101A, 101B and the cross fader 102), which are configured in the same manner as those of a typical DJ controller, will not be detailed herein.

Figure 2:
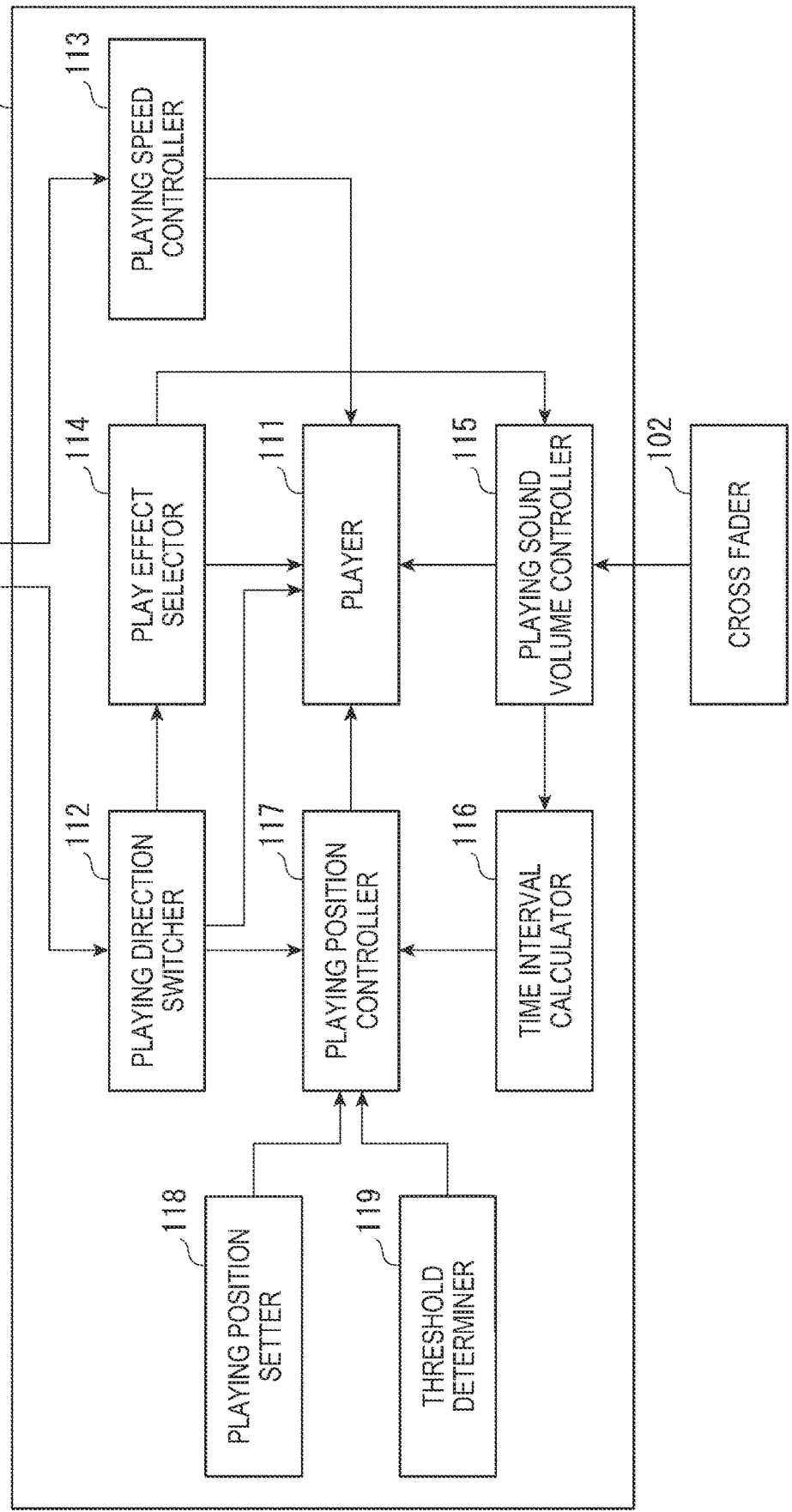
FIG. 2 is a block diagram illustrating a configuration of audio data processing functions of the DJ controller depicted in FIG. 1.

FIG. 2 is a block diagram illustrating a configuration of audio data processing functions of the DJ controller depicted in FIG. 1. In the illustrated example, the audio data processing function 110 of the DJ controller 100 is performed by components including a player 111, a playing direction switcher 112, a playing speed controller 113, a play effect selector 114, a playing sound volume controller 115, a time interval calculator 116, a playing position controller 117, a playing position setter 118, and a threshold determiner 119. The above components are implemented by a Central Processing Unit (CPU) or Digital Signal Processor (DSP) that operates, for instance, in accordance with a program stored in a memory. Hereinafter, the functions of the respective components will be further described.

The player 111 is configured to play audio data of a music piece. Specifically, the player 111 is configured to process the audio data of the music piece inputted through a non-illustrated input interface (e.g. Universal Serial Bus (USB) of a terminal device such as a personal computer (PC) and a smartphone connected through wired or wireless communication unit) or a removable recording medium (e.g. USB memory) and output the processed audio data to a speaker or other external device through a non-illustrated output interface. The player 111 is configured to determine the playing position, the playing speed, and the playing sound volume of the audio data under the control of the later-described playing direction switcher 112, playing speed controller 113, playing sound volume controller 115, and playing position controller 117. Further, the player 111 is configured to apply various effects to the audio data to be played under the control of the play effect selector 114. The player 111 is configured to mutually independently play the first audio data and the second audio data respectively imported into the A deck and the B deck described with reference to FIG. 1. Therefore, the player 11 can perform the above-described controls mutually independently on the first audio data and the second audio data.

The playing direction switcher 112 is configured to switch the forward play and the reverse play of the audio data played by the player 111 in response to the operation signal generated by the turntable platters 101. Further, the playing speed controller 113 is configured to control the playing speed of the audio data played by the player 111 in response to the operation signal from the turntable platters 101. The turntable platter 101 illustrated in FIG. 2 corresponds to one of the turntable platters 101A, 101B depicted in FIG. 1. As described above, since the player 111 is configured to play the audio data of the A deck and the B deck in a mutually independent manner, two playing direction switchers 112 and two playing speed controllers 113 are optionally provided, into which respective operation signals of the turntable platters 101A, 101B are inputted. Alternatively, the operation signal of one of the turntable platters 101A, 101B is optionally selectively inputted to a single playing direction switcher 112 and a single playing speed controller 113.

Specifically, the playing direction switcher 112 is configured to control the player 111 to play the audio data in the forward direction when the turntable platter 101 is not operated or is rotated in a first (clockwise) direction, and configured to control the player 111 to play the audio data in the reverse direction when the turntable platter 101 is rotated in a second (counterclockwise) direction opposite the first direction. In a case where the audio data is associated with a time code, the time code increases in the forward play whereas the time code decreases in the reverse play. Further, the playing speed controller 113 is configured to control the player 111 to play the audio data at a normal speed determined depending on, for instance, BPM of the music piece when the turntable platter 101 is not operated, and configured to control the player 111 to change the playing speed depending on the rotation speed when one of the turntable platters 101 is rotated either in the forward direction or reverse direction by a user's operation. For instance, if the turntable platter 101 is rotated in the first (clockwise) direction, the playing speed controller 113 decreases the playing speed to be lower than the normal speed when the rotation speed is lower than a threshold (e.g. 33 RPM or 45 RPM) and raises the playing speed to be faster than the normal speed when the rotation speed is higher than the threshold.

The play effect selector 114 is configured to select a play effect to be applied to the audio data played by the player 111, depending on the playing direction that is switched by the playing direction switcher 112. Specifically, the play effect selector 114 applies a first play effect to the audio data when the playing direction of the audio data, which is determined by the playing direction switcher 112, is the forward direction and applies a second play effect to the audio data when the playing direction is the reverse direction. When the audio data is played in the forward direction, the turntable platter 101 is in either one of two modes (i.e., either not operated or rotated in the first (clockwise) direction). When the turntable platter 101 is not operated, the play effect selector 114 may not apply the first play effect even when the audio data is played in the forward direction. Examples of the play effects applied by the play effect selector 114 include "no effect," "mute effect," "echo effect," and "filter effect." As for the "mute effect", the play effect selector 114 controls the playing sound volume controller 115 to mute the audio data. In this case, "mute" means that the playing sound volume is set substantially at zero. Otherwise, the play effect selector 114 controls the player 111 to apply the effect such as echo and filter to the audio data during playing.

The playing sound volume controller 115 is configured to control the playing sound volume of the audio data played by the player 111 in response to the operation signal from the cross fader 102. As described above, the cross fader 102 is an operator for controlling a balance between playing sound volumes for the music piece of the A deck (the first audio data) and the music piece of the B deck (the second audio data). Accordingly, the playing sound volume controller 115 cross-fades the playing sound volume of the audio data played by each of the A deck and B deck in response to the operation signal from the cross fader 102. In this case, from the viewpoint of each of the A deck and the B deck, the playing sound volume controller 115 controls the playing sound volume of the audio data depending on the operation on the cross fader 102. Alternatively, at the start of later-described specific functions, the playing sound volume controller 115 may control the playing sound volume of the audio data under the control of the play effect selector 114 instead of the operation signal from the cross fader 102. The playing sound volume controller 115 may be configured to control the playing sound volume by, for instance, operating the channel faders 106A, 106B and/or a master volume. A detailed description of the structure of the playing sound volume controller 115 will be omitted herein because of its similarity with that in typical DJ controllers.

The time interval calculator 116 is configured to calculate a time interval of occurrences of a predetermined event in the operation signal inputted from the cross fader 102 to the playing sound volume controller 115. Herein, the predetermined event is detected when, for instance, the cross fader 102 starts being moved from an end near the A deck or the B deck toward an opposite end. In this case, the event refers to reception of an operation signal for increasing the playing sound volume of the audio data played by the A deck or the B deck from 0 or a value close to 0. For instance, when the cross fader 102 is implemented by a linear potentiometer, the above event is detected as a change in an output of the cross fader 102 from an upper limit value or a lower limit value, or decrease or increase in the output from the upper limit value or the lower limit value beyond a predetermined range.

The playing position controller 117 is configured to control the playing position of the audio data played by the player 111. As described above, since the player 111 plays the audio data of the A deck and the B deck in a mutually independent manner, two playing position controllers 117 may be provided. Alternatively, a single playing position controller 117 may selectively control the playing position of the audio data of one of the A deck and the B deck. The deck to be controlled may be set through a user's operation. Alternatively, the playing direction may be automatically set, for instance, on the deck on which the scratching is performed by the turntable platters 101. Whereas the above-described playing direction switcher 112 and the playing speed controller 113 fast-forward or fast-rewind the played audio data according to the operation on the turntable platters 101 to change the playing position, the playing position controller 117 shifts the playing position, for instance, by jumping to a position preset by the playing position setter 118.

Specifically, the playing position controller 117 shifts the playing position of the played data when the time interval calculated by the time interval calculator 116 is more than the threshold, and continues playing the audio data without shifting the playing position when the time interval is not more than the threshold. Alternatively, the playing position controller 117 changes the playing position of the audio data to a predetermined position when the reverse play is switched to the forward play by the playing direction switcher 112, and otherwise continues playing the audio data without shifting the playing position. The playing position controller 117 may be configured to move the playing position by, for instance, operating the performance pads 103A, 103B. A detailed description of the structure of the playing position controller 117 will be omitted herein because of its similarity with that in typical DJ controllers.

The playing position setter 118 is configured to set a destination for the playing position to be moved by the playing position controller 117. Specifically, the playing position setter 118 sets the destination of the playing position according to a user's operation. The setting of the destination is performed through, for instance, a setting operation of a hot cue using the performance pads 103A, 103B. However, the destination is not necessarily set as in this example. Meanwhile, the threshold determiner 119 is configured to determine the threshold used for the determination based on the time interval by the playing position controller 117. The threshold determiner 119 may determine the threshold, for instance, depending on the BPM of a backtrack. Herein, the "backtrack" means a music piece (second audio data) played by the B deck when the scratching is performed on a music piece (first audio data) played by the A deck. For instance, the threshold determiner 119 may determine, as a threshold, a time for a half, one third, or one fourth of the beat calculated based on the BPM of the backtrack.

Figure 3:
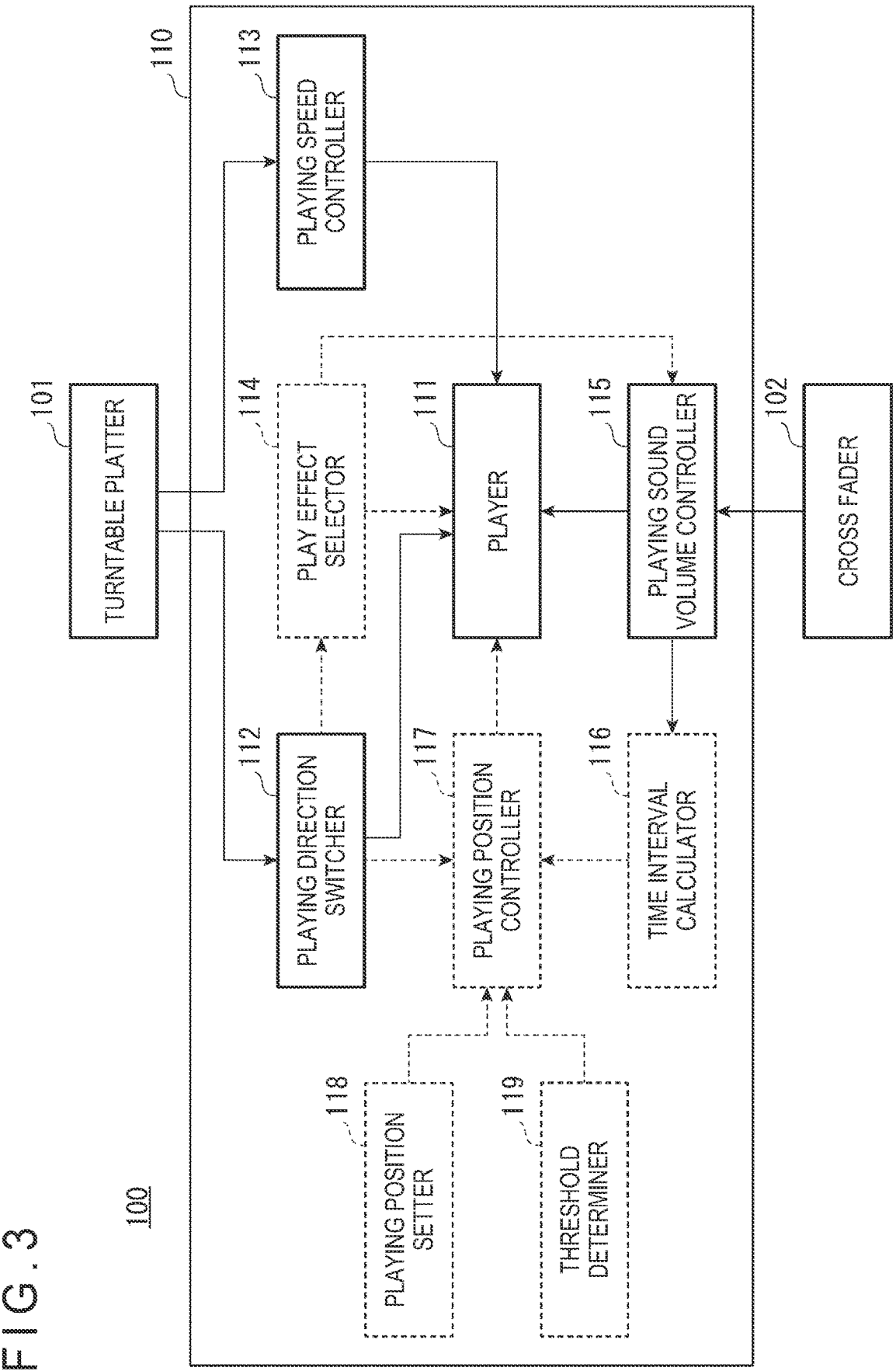
FIG. 3 is a block diagram illustrating functional components that are enabled when practice assistance functions are not activated in the DJ controller illustrated in FIG. 2.

FIG. 3 is a block diagram illustrating functional components that are enabled when practice assistance functions are not activated in the DJ controller illustrated in FIG. 2. The functional components enabled in this instance are the player 111, the playing direction switcher 112, the playing speed controller 113, and the playing sound volume controller 115. In this case, the playing direction and the playing speed of the audio data played by the player 111 are respectively controlled by the playing direction switcher 112 and the playing speed controller 113 in response to the operation signal from the turntable platter 101. Further, the playing sound volume of the audio data is set by the playing sound volume controller 115 in response to the operation signal from the cross fader 102. In this case, in order to perform the scratching, a user has to control the playing sound volume (including muting of the playing sound volume) by accurately operating the cross fader 102 while repeating playback of a desired section of the audio data by rotating the turntable platter 101 at accurate timing and rotation amount.

Simultaneous performance of the above-described two operations, which is necessary in order to perfect the playing (scratching) technique, is not easily mastered by a beginner as described above. In this regard, the DJ controller according to the present exemplary embodiment provides first to third scratching practice functions described below. It should be noted that, for instance, only one of the first to third scratching practice functions may be implemented, or two thereof may be implemented, or all three thereof may be implemented. When a plurality of practice functions are implemented, the functions may be automatically selected and activated by, for instance, operating the turntable platters 101 or the cross fader 102 or, alternatively, selected and activated by a user's operation through the effect adjustment knob 104, the effect activation button 105, and the like.

First Practice Assistance Function

Figure 4:
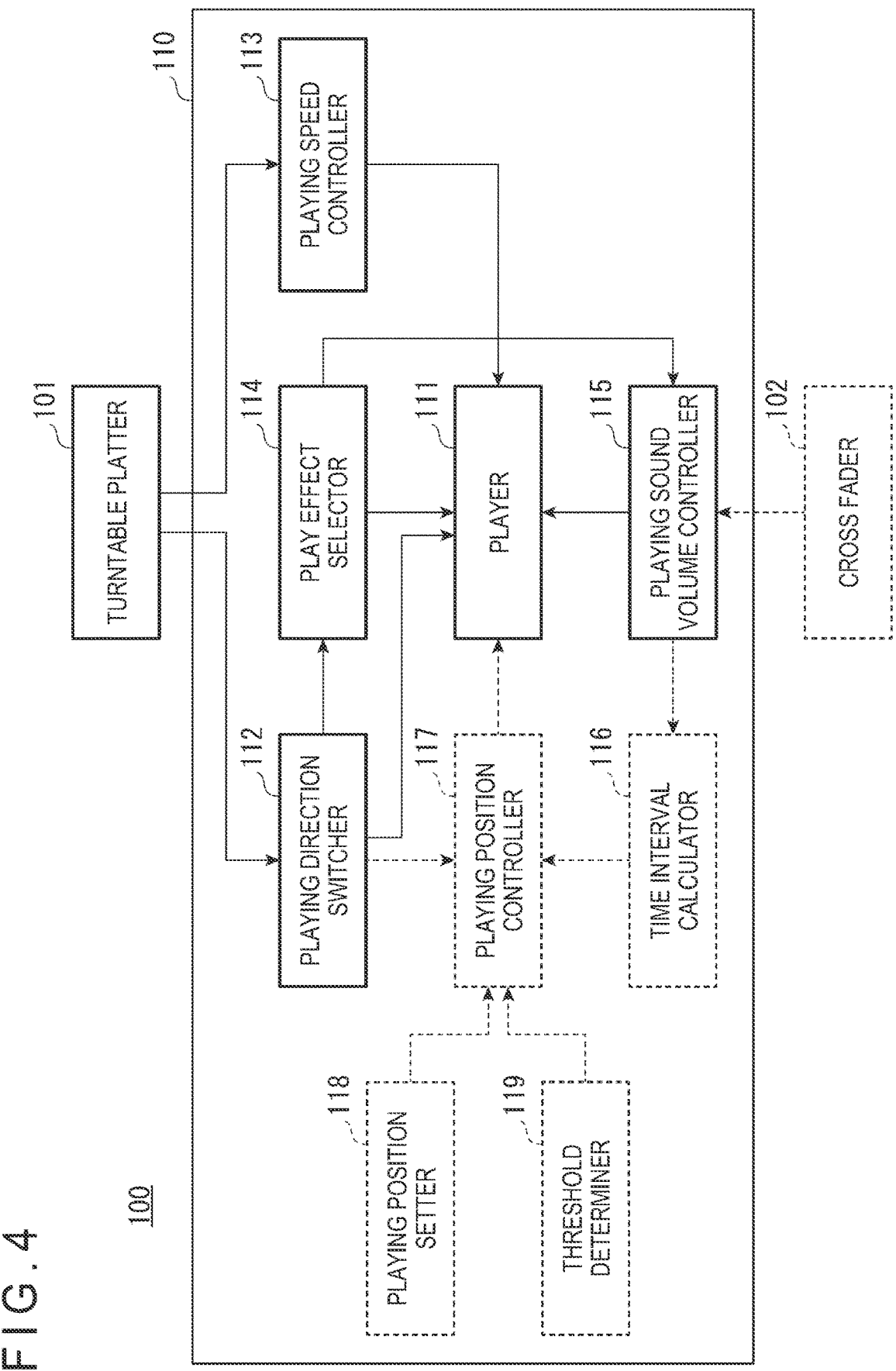
FIG. 4 is a block diagram illustrating functional components that are enabled when a first practice assistance function is activated in the DJ controller illustrated in FIG. 2.

FIG. 4 is a block diagram illustrating functional components that are enabled when a first practice assistance function is activated in the DJ controller illustrated in FIG. 2. The functional components enabled in this instance are the player 111, the playing direction switcher 112, the playing speed controller 113, the play effect selector 114, and the playing sound volume controller 115. The operation signal of the cross fader 102 inputted to the playing sound volume controller 115 is disabled. In other words, the playing sound volume controller 115 is configured to control the playing sound volume of the audio data regardless of the control signal from the cross fader 102. In the first practice assistance function, the control over the playing sound volume using the cross fader 102 is assisted by the play effect selector 114 and the playing sound volume controller 115. Accordingly, a user can devote himself/herself on the operation on the turntable platter 101.

Figure 5:
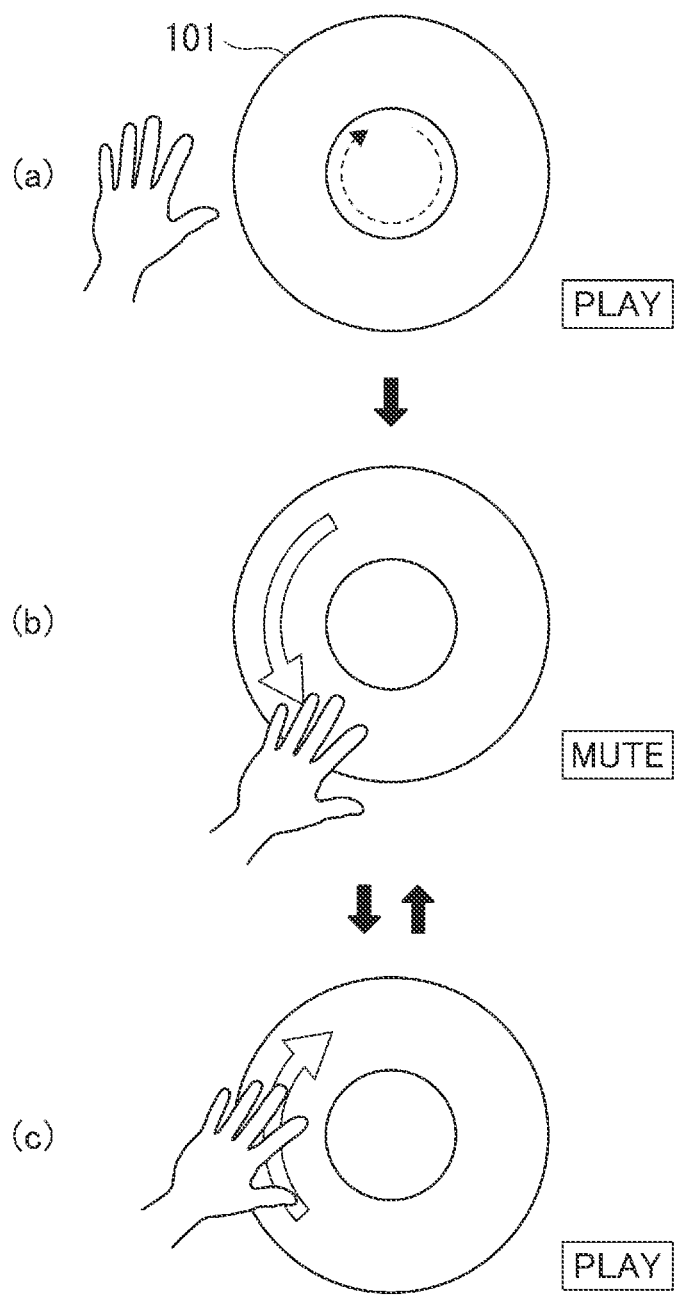
FIG. 5 is a diagram conceptually illustrating the first practice assistance function.
Figure 6:
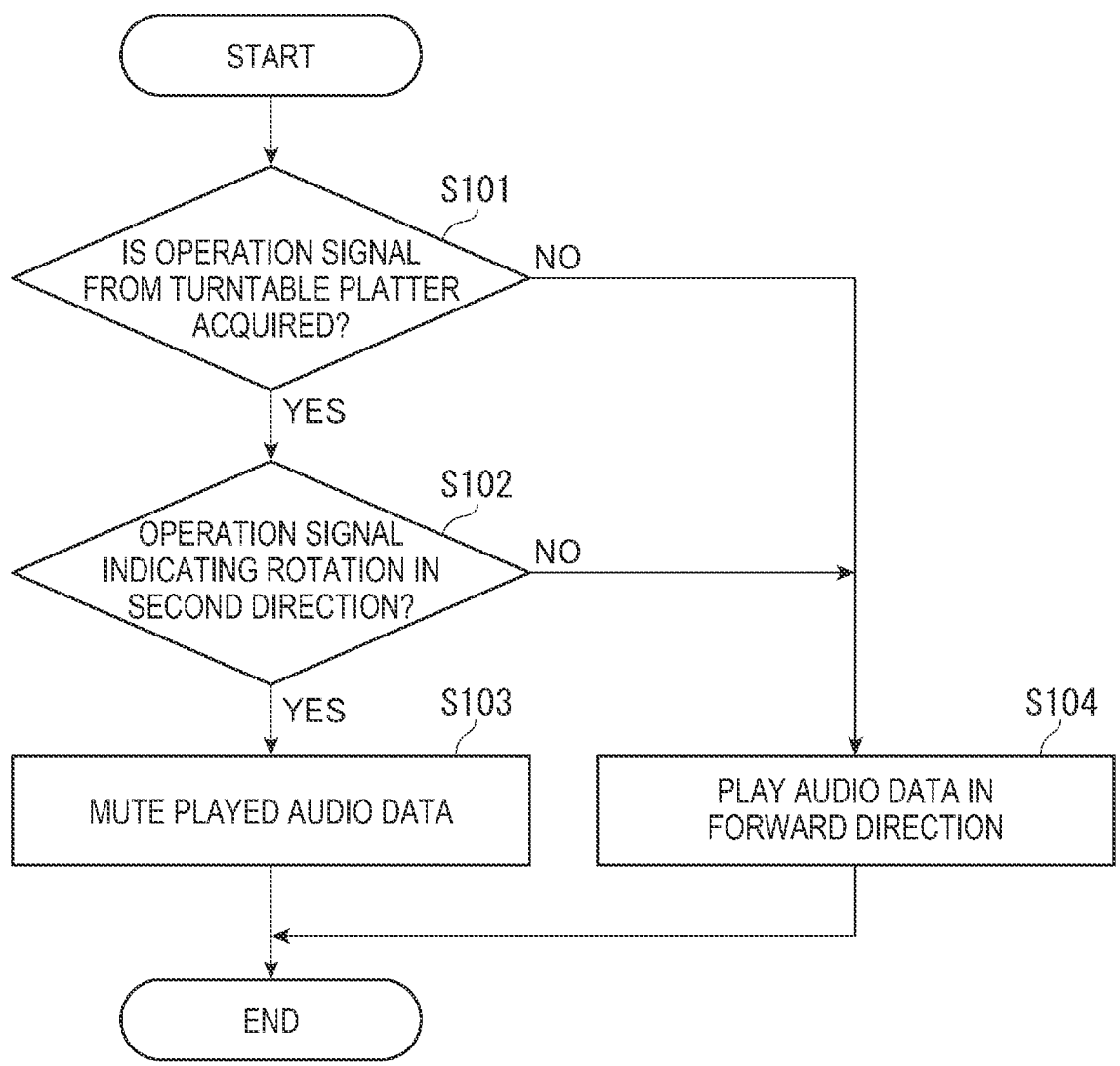
FIG. 6 is a flowchart illustrating a process according to an example shown in FIG. 5.

FIG. 5 is a diagram conceptually illustrating the first practice assistance function. FIG. 6 is a flowchart illustrating a process according to an example shown in FIG. 5. As illustrated in (a) in FIG. 5, when a user does not operate the turntable platter 101, the turntable platter 101 is not rotated, or is rotated at a predetermined rotation speed in the first (clockwise) direction, where the operation signal of the turntable platter is not received (NO in Step S101). In this case, the player 111 plays the audio data in the forward direction at a normal speed (Step S104). As illustrated in (b) in FIG. 5, when the user rotates the turntable platter 101 in the second (anticlockwise) direction, the operation signal of the turntable platter 101 is acquired (YES in Step S101). This operation signal indicates a rotation in the second direction (YES in Step S102). In this case, the audio data, which is played in the reverse direction by the playing direction switcher 112, is simultaneously applied with the "mute effect" by the play effect selector 114, so that the played audio data is muted (Step S103).

Further, as illustrated in (c) in FIG. 5, also when the user rotates the turntable platter 101 in the first (clockwise) direction, the operation signal of the turntable platters 101 is acquired (YES in Step S101). This operation signal indicates a rotation in the first direction (No in Step S102). In this case, the playing direction switcher 112 plays the audio data in the forward direction and the play effect selector 114 applies "no effect" to the audio data. As a result, the audio data is played in the forward direction (Step S104). It should be noted that, the control over the playing speed, which in this case is done by the playing speed controller 113 depending on the rotation speed of the turntable platter 101, is not reflected in the flowchart in FIG. 6.

The scratching technique, where the music play is muted during the reverse play, is achieved by the above-described function without a user's operation on the cross fader 102. Accordingly, a user can concentrate on the operation on the turntable platter 101 without getting conscious about synchronization with the operation on the cross fader 102 in practicing the scratching. Further, upon operating the turntable platter 101, since the playing sound volume varies in the same manner as operating the cross fader 102 at an ideal timing, the user can efficiently practice the scratching while enjoying the played sound instead of experiencing monotonous work.

Figure 7:
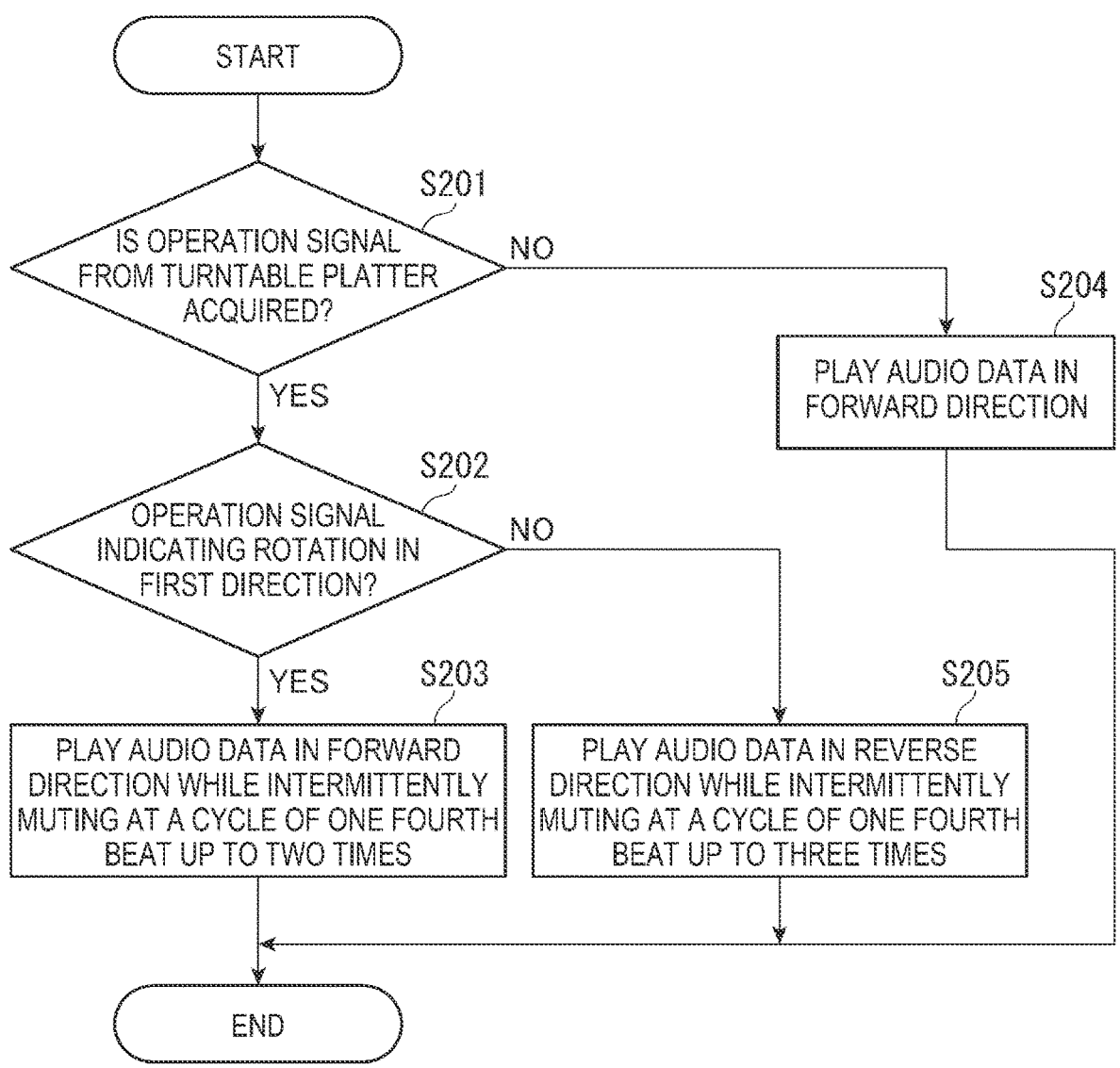
FIG. 7 is a flowchart illustrating a process according to another example of the first practice assistance function.

FIG. 7 is a flowchart illustrating a process according to another example of the first practice assistance function. In this example, "mute effects" applied when the turntable platters 101 are rotated in the first (clockwise) direction and in the second (anticlockwise) direction are mutually different. In the present exemplary embodiment, the "mute effect" includes a "full mute effect" for continuously muting the sound while the effect is applied and an "intermittent mute effect" for intermittently muting the sound at a predetermined cycle. A plurality of different effects with different cycles and number of times for muting the sound can be set for the intermittent mute effect. In the example illustrated in FIG. 7, when the turntable platter 101 is rotated in the first (clockwise) direction, the intermittent mute effect is applied so that the sound is muted up to twice (at the maximum) at a cycle of one fourth of the beat of the music piece played based on the audio data. In contrast, when the turntable platter 101 is rotated in the second (anticlockwise) direction, the intermittent mute effect is applied so that the sound is muted up to three times (at the maximum) at a cycle of one fourth of the beat of the music piece.

Specifically, when the operation signal of the turntable platter is not acquired (NO in Step S201), the player 111 plays the audio data in the forward direction at a normal speed (Step S204). It should be noted that at this time, the play effect selector 114 does not apply the later-described intermittent mute effect even when the audio data is played in the forward direction. When the operation signal of the turntable platter is acquired (YES in Step S201) and the operation signal indicates a rotation in the first direction (YES in Step S202), the playing direction switcher 112 plays the audio data in the forward direction and the play effect selector 114 applies the first intermittent mute effect: specifically, the effect for muting the sound up to twice (at the maximum) at a cycle of one fourth of the beat of the music piece (Step S203). When the operation signal indicates a rotation in the second direction (NO in Step S202), the playing direction switcher 112 plays the audio data in the reverse direction and the play effect selector 114 applies the second mute effect: specifically, the effect for muting the sound up to three times (at the maximum) at a cycle of one fourth of the beat of the music piece (Step S205). It should be noted that the control over the playing speed, which is done by the playing speed controller 113 depending on the rotation speed of the turntable platter 101, is also not reflected in the flowchart in FIG. 7.

In the above-described example of FIG. 7, as in the example of FIGS. 5 and 6, since the muting pattern often used in the scratching can be achieved without operating the cross fader 102, a user can concentrate on the operation on the turntable platter 101 and efficiently practice the scratching while enjoying the played sound.

It should be noted that the first effect applied during the forward play and the second effect applied during the reverse play, which are respectively "no effect" and "full mute effect" in the above example, may be respectively "full mute effect" and "no effect" in some other examples. In the latter examples, the effect may not be applied in the forward play caused by no operation of the turntable platter. Alternatively, the intermittent mute effect may be applied so that the first effect applied during the forward play is the intermittent mute effect and the second effect applied during the reverse play is the full mute effect. Further alternatively, the first effect and the second effect may be respectively the full mute effect and the intermittent mute effect. The cycle for muting the sound for the intermittent mute effect can be set, for instance, at a half, one fourth, or one eighth of the beat of the played music piece. Further, the number of times for muting the sound for the intermittent mute effect may be set, for instance, at two, three, or six.

In addition, as an additional function not limited to the above-described assistance function for practicing the scratching, the play effect selector 114 is optionally configured to apply effect(s) other than the mute effect (specifically, for instance, the echo effect or the filter effect) during the forward play and/or the reverse play. In this case, the operation signal from the cross fader 102 is also not disabled at the time of starting the function, where the playing sound volume controller 115 controls the playing sound volume of the audio data in response to the operation signal from the cross fader 102. Such a function is used when a user who has already mastered to perform scratching by operating both of the turntable platter 101 and the cross fader 102 gives performance by adding a play effect other than scratching to the played sound. Further, the effect may be applied in a manner superposed on the above-described mute effect while, for instance, the user is practicing the scratching. A non-limited example of the combination of the play effects in the above case is that the first effect applied during the forward play is "no effect" and the second effect applied during the reverse play is "echo effect." Alternatively, the first effect and the second effect may be respectively the echo effect and the filter effect.

Second Practice Assistance Function

Figure 8:
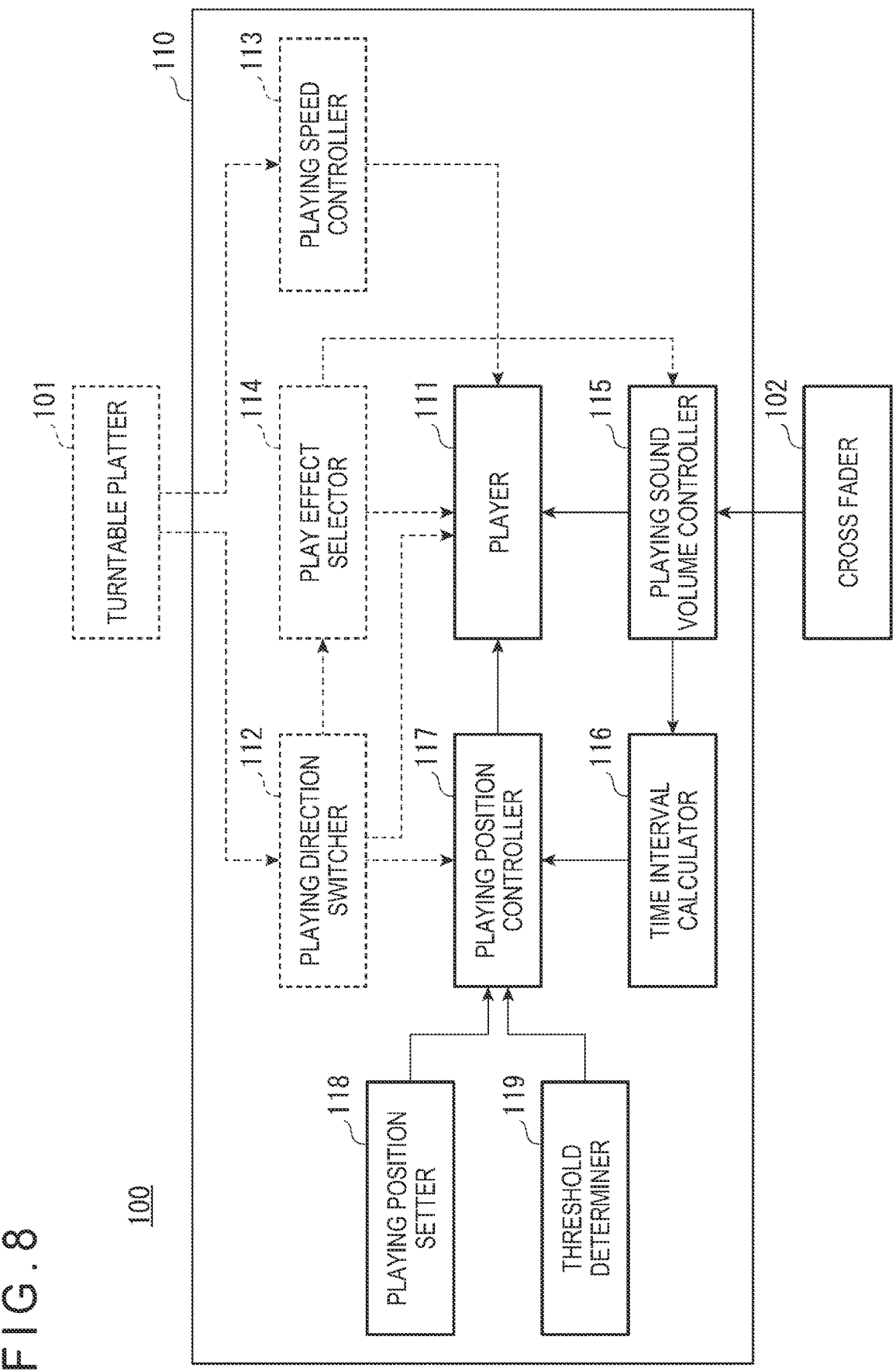
FIG. 8 is a block diagram illustrating functional components that are enabled when a second practice assistance function is activated in the DJ controller illustrated in FIG. 2.

FIG. 8 is a block diagram illustrating functional components that are enabled when a second practice assistance function is activated in the DJ controller illustrated in FIG. 2. The functional components enabled in this case are the player 111, the playing sound volume controller 115, the time interval calculator 116, the playing position controller 117, the playing position setter 118, and the threshold determiner 119, whereas the playing direction switcher 112, the playing speed controller 113, and the play effect selector 114 are disabled. In the second practice assistance function, the setting of the playing direction and the playing speed using the turntable platter 101 is assisted by the playing position controller 117, so that a user can devote himself/ herself on the operation on the cross fader 102.

Figure 9:
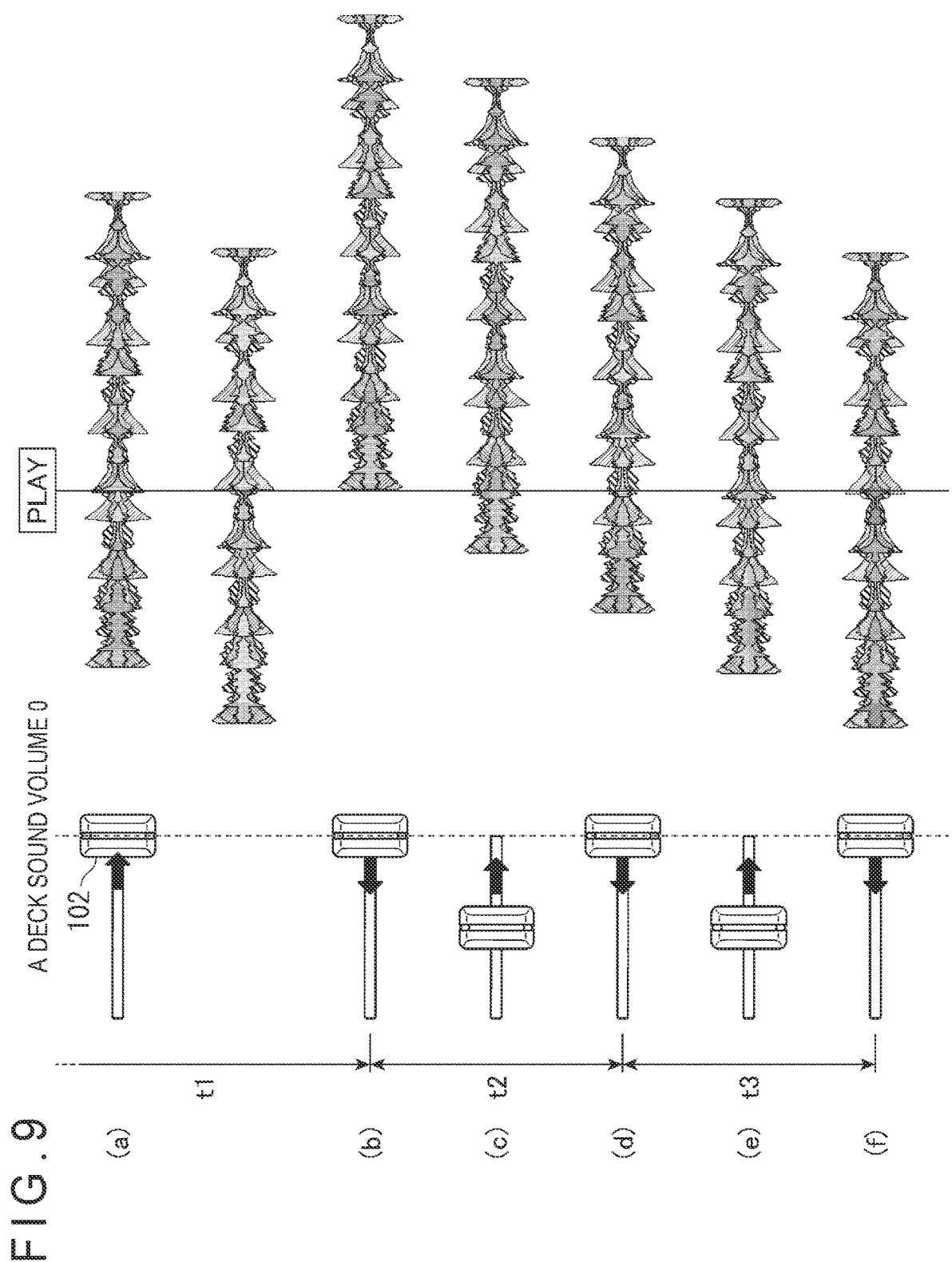
FIG. 9 is a diagram conceptually illustrating the second practice assistance function.
Figure 10:
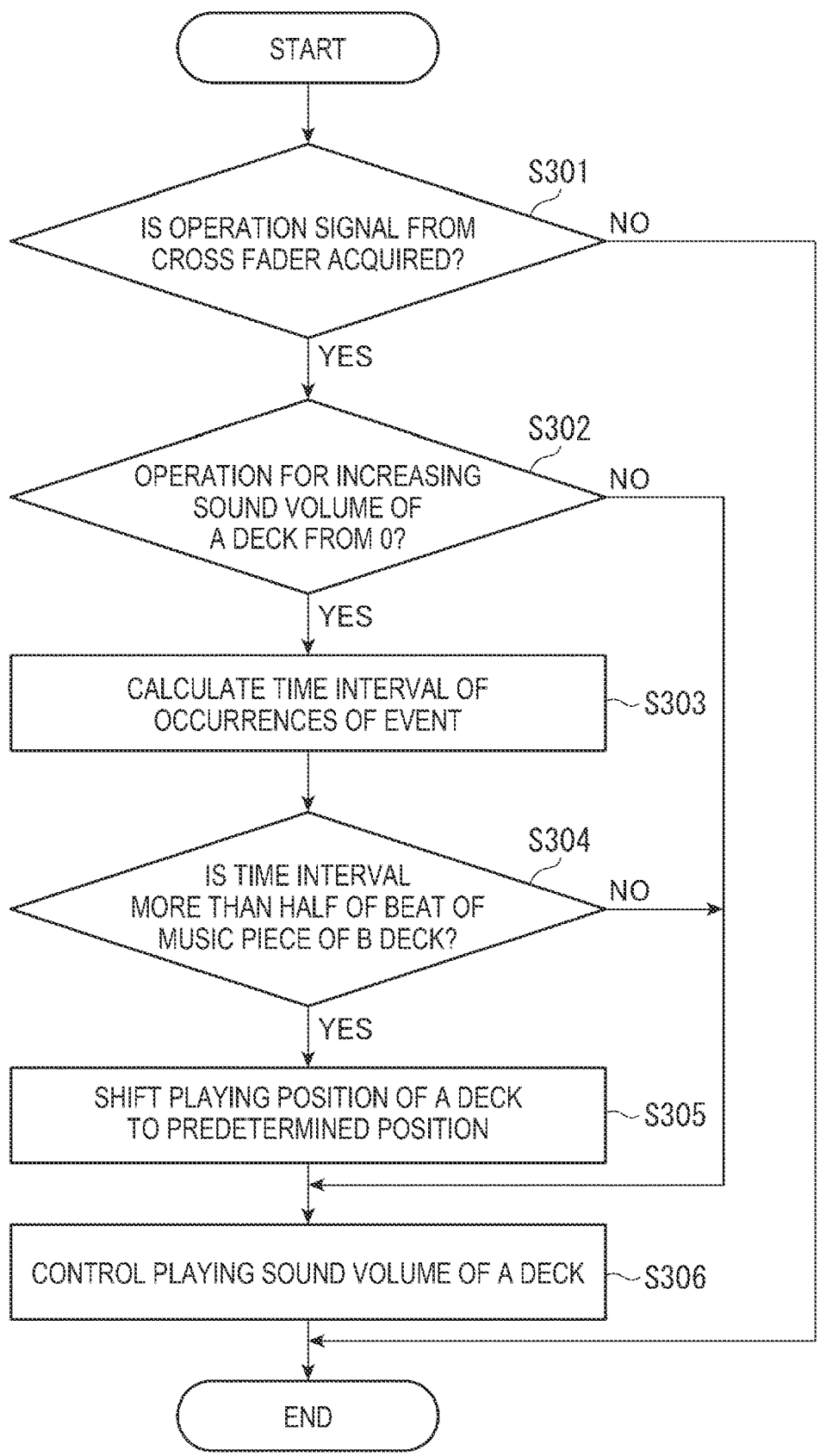
FIG. 10 is a flowchart illustrating a process according to an example shown in FIG. 9.

FIG. 9 is a diagram conceptually illustrating the second practice assistance function. FIG. 10 is a flowchart illustrating a process according to an example shown in FIG. 9. It should be noted that the scratching is applied to a music piece played by the A deck (first audio data) in the example of FIG. 9. As illustrated in (a) in FIG. 9, an operation signal is acquired by sliding the cross fader 102 (YES in Step S301). The operation in this case is an operation for setting the playing sound volume of the A deck at 0, but is not an operation for increasing the playing sound volume from 0 (NO in Step S302). Accordingly, no other process is performed and the playing sound volume controller 115 controls the playing sound volume of the audio data played by the A deck in response to the operation signal (Step S306). In contrast, as illustrated in (b) in FIG. 9, when the cross fader 102 is slid to an end near the A deck and then returned, an operation signal for increasing the playing sound volume of the A deck from 0 is acquired (YES in Step S301 and Step S302). In this case, the time interval calculator 116 calculates a time interval for an occurrence of the event, that is, the event for increasing the playing sound volume of the A deck from 0 (Step S303).

In the case of (b) in FIG. 9, a time interval t1 from a preceding event (not illustrated) is long and is more than the threshold determined by the threshold determiner 119, the threshold being specifically a time for a half of the beat of the music piece played by the B deck (YES in Step S304). In this case, after the playing position controller 117 moves the playing position of the audio data played by the A deck to a position preset by the playing position setter 118 (Step S305), the playing sound volume controller 115 controls the playing sound volume of the audio data played by the A deck in response to the operation signal (Step S306). The destination of the playing position in Step S305 is preset by the playing position setter 118, for instance, through the setting operation of a hot cue using the performance pads 103A, 103B.

Further, as illustrated in (c) and (d) in FIG. 9, when the cross fader 102 is once moved away from the end near the A deck, then again slid to the end near the A deck, and returned, an operation signal for increasing the playing sound volume of the A deck from 0 is again acquired (YES in Step S301 and Step S302). In this case, a time interval t2 from the preceding event calculated in Step S303 is short and does not exceed the threshold that is a half of the beat of the music piece played by the B deck (NO in Step S304). In this case, the music is continuously played without shifting the playing position of the audio data played by the A deck, and the playing sound volume controller 115 controls the playing sound volume of the audio data played by the A deck in response to the operation signal (Step S306). When the same operations are also repeated in (e) and (f) in FIG. 9, a time interval t3 does not exceed the threshold, so that the music is continuously played without shifting the playing position of the audio data played by the A deck, and the playing sound volume controller 115 controls the playing sound volume of the audio data played by the A deck in response to the operation signal (Step S306).

The above-described function enables the scratching technique that "the music play is muted during the reverse play and variation is applied to the played music by intermittent muting in the subsequent forward play" without an operation on the turntable platters 101. Accordingly, a user can concentrate on the operation on the cross fader 102 without getting conscious about the operation timing and the rotation amount of the turntable platter 101 in practicing the scratching. Further, since the playing position changes by operating the cross fader 102 in the same manner as operating the turntable platter 101 at ideal timing and rotation amount, a user can efficiently practice the scratching while enjoying the played sound instead of experiencing monotonous work.

Third Practice Assistance Function

Figure 11:
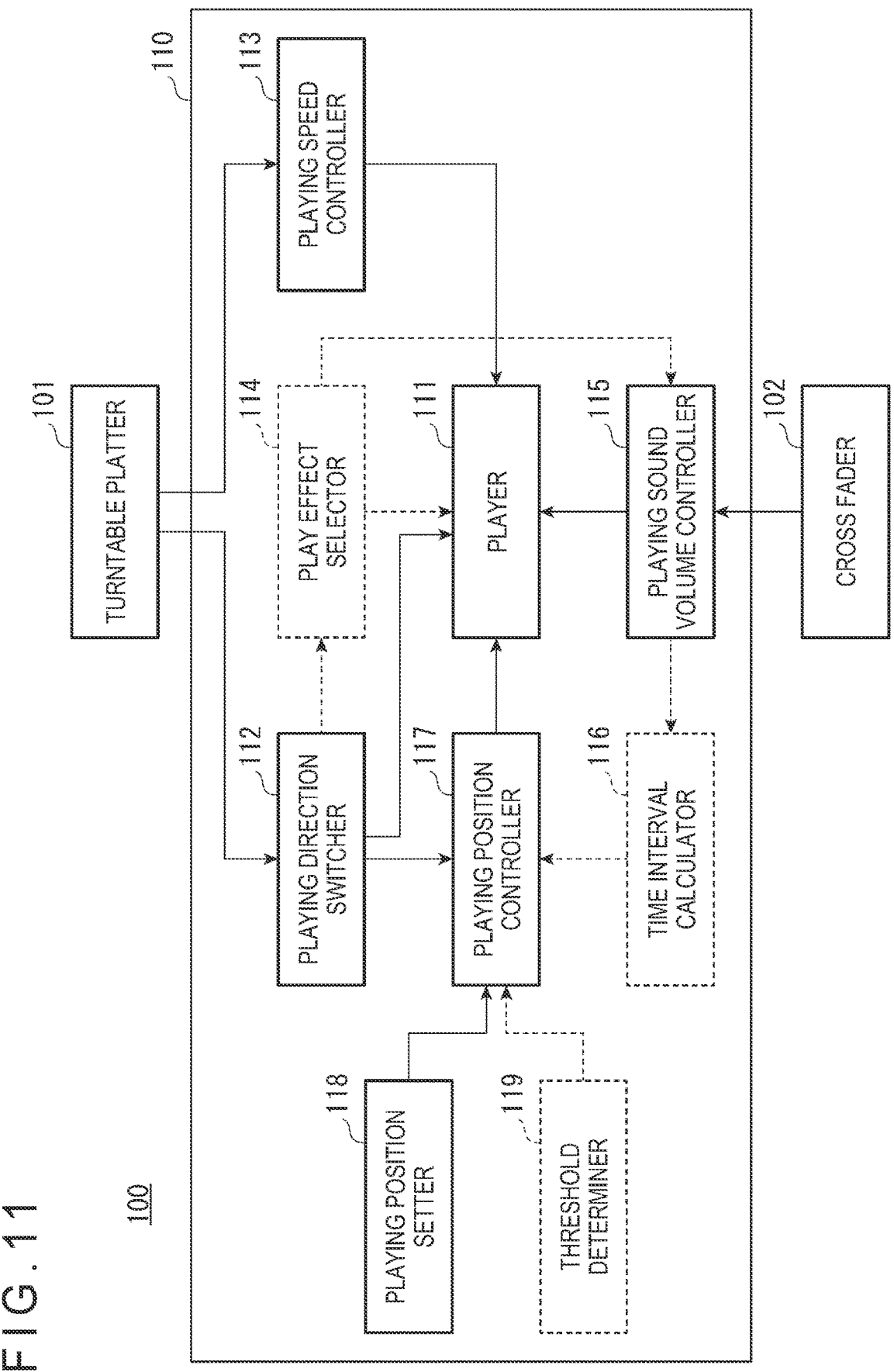
FIG. 11 is a block diagram illustrating functional components that are enabled when a third practice assistance function is activated in the DJ controller illustrated in FIG. 2.

FIG. 11 is a block diagram illustrating functional components that are enabled when a third practice assistance function is activated in the DJ controller illustrated in FIG. 2. The functional components enabled in this case are the player 111, the playing direction switcher 112, the playing speed controller 113, the playing sound volume controller 115, the playing position controller 117, and the playing position setter 118, whereas the play effect selector 114, the time interval calculator 116, and the threshold determiner 119 are disabled. It should be noted that when, for instance, the play effect selector 114 is configured to apply an effect other than the mute effect, the play effect selector 114 may be enabled in combination with the first practice assistance function. In the third practice assistance function, the cueing operation of the playing position using the turntable platter 101 is assisted by the playing position controller 117 when both of the turntable platters 101 and the cross fader 102 are operated to practice the scratching, so that a user can devote himself/herself on practice for matching operation timings on the turntable platter 101 and the cross fader 102.

Figure 12:
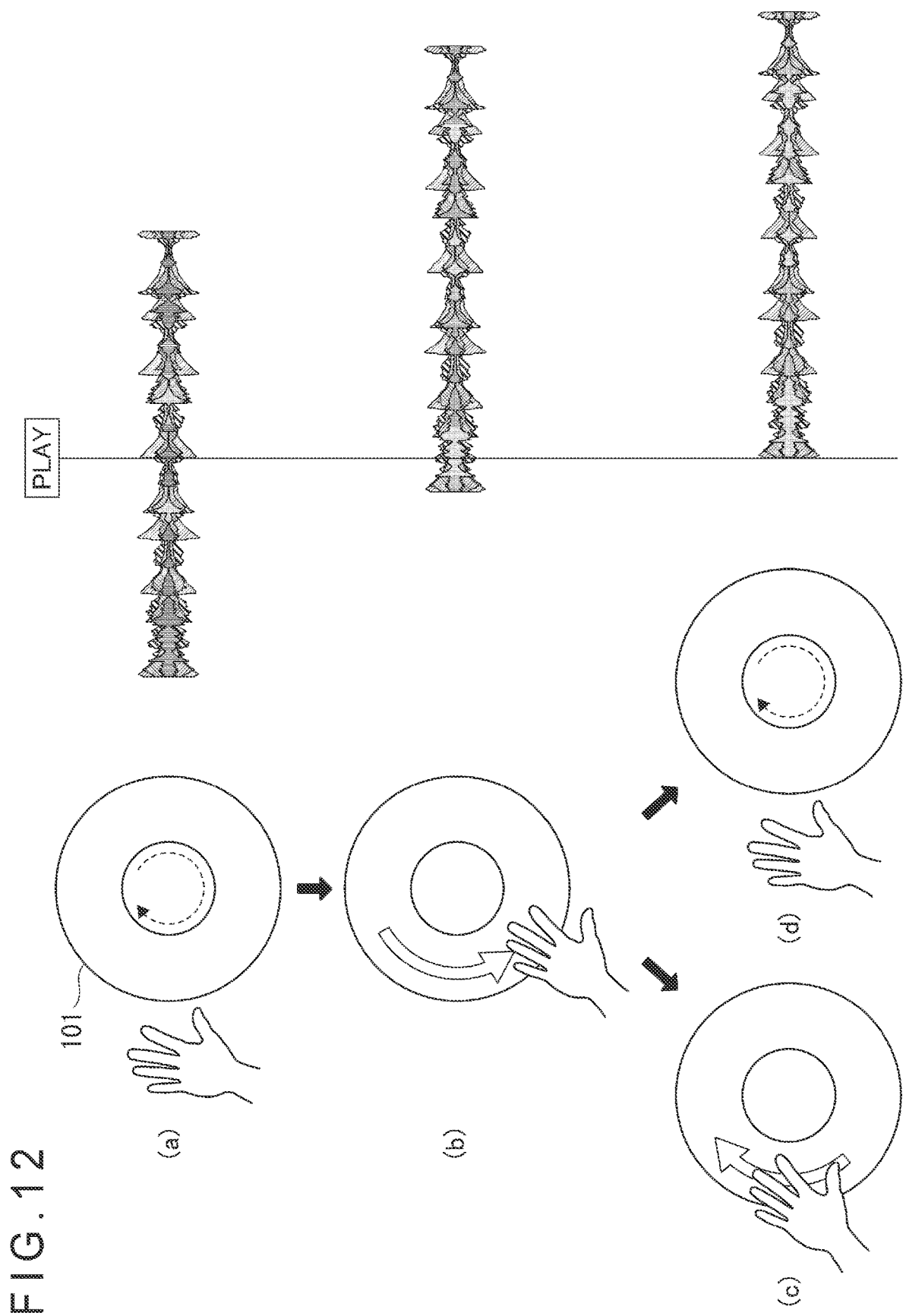
FIG. 12 is a diagram conceptually illustrating the third practice assistance function.
Figure 13:
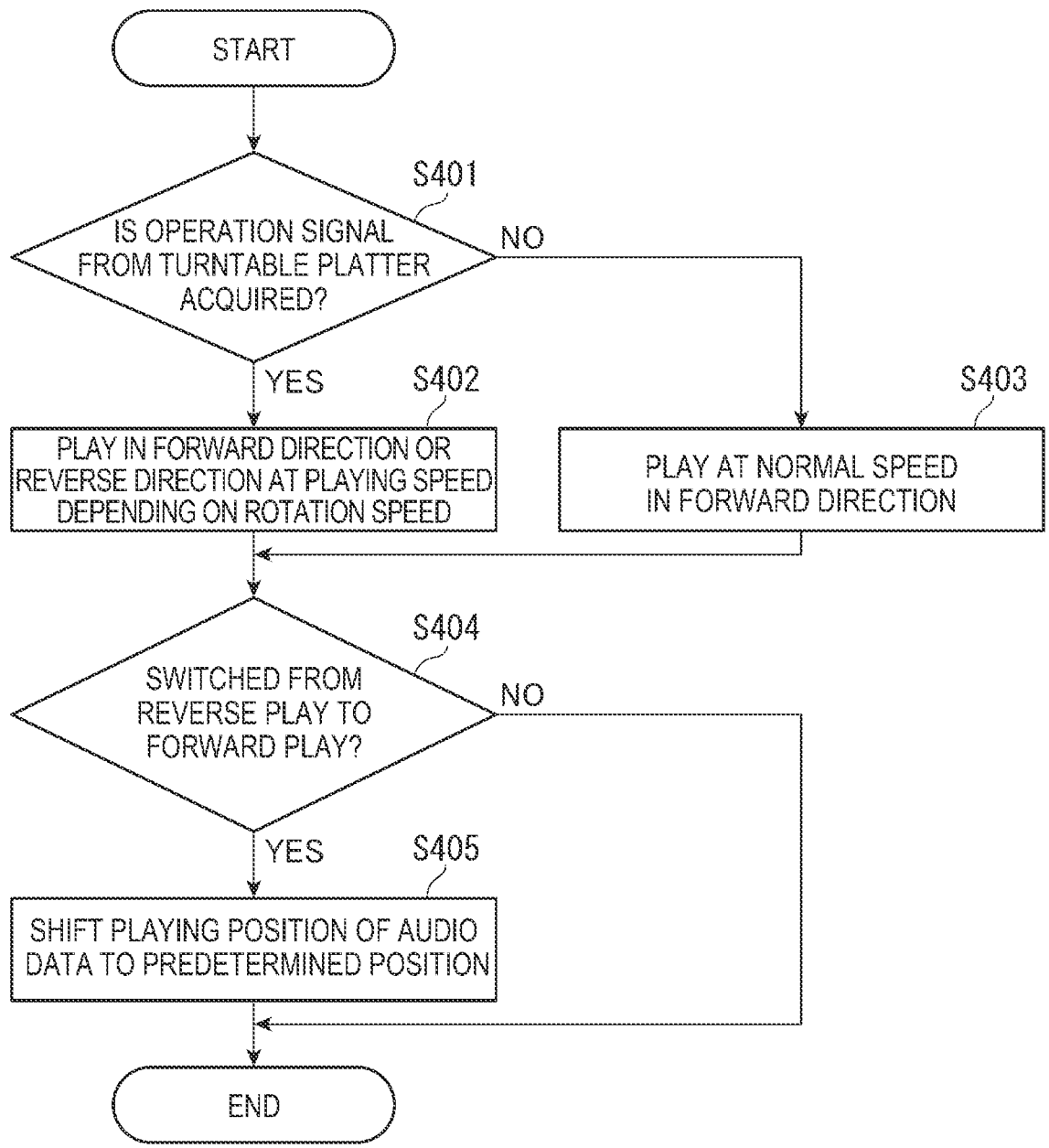
FIG. 13 is a flowchart illustrating a process according to an example shown in FIG. 12.

FIG. 12 is a diagram conceptually illustrating the second practice assistance function. FIG. 13 is a flowchart illustrating a process according to an example shown in FIG. 12. As illustrated in (a) and (d) in FIG. 12, when a user does not operate the turntable platter 101, the turntable platter 101 is not rotated, or is rotated at a predetermined rotation speed in the first (clockwise) direction, where the operation signal of the turntable platter is not received (NO in Step S401). In this case, the player 111 plays the audio data in the forward direction at a normal speed (Step S403). In contrast, as illustrated in (b) and (c) in FIG. 12, when the user rotates the turntable platter 101 in the second (anticlockwise) direction or the first (clockwise) direction, the operation signal of the turntable platter 101 is acquired (YES in Step S401), where the playing direction switcher 112 and the playing speed controller 113 control the player 111 to play the audio data in the reverse direction or forward direction at the playing speed depending on the rotation speed of the turntable platter 101 (Step S402).

In addition, in the present function, whether the playing direction has been switched from the reverse direction to the forward direction is checked in each of the above cases (Step S404). In the example of FIG. 12, when the turntable platter 101 is rotated in the second direction where the audio data is played in the reverse direction (as illustrated in (b)) and then is switched to be rotated in the first direction (as illustrated in (c)) or when the turntable platter 101 is not operated with the user's hand being released (as illustrated in (d)), the playing direction of the audio data is switched from the reverse direction to the forward direction (YES in Step S404). In this case, after the playing position controller 117 shifts the playing position of the audio data to the position preset by the playing position setter 118 (Step S405), the audio data is played in the forward direction at the playing speed determined in the above Step S402 or Step S403. In contrast, in other cases (NO in Step S404), without shifting the playing position, the audio data is played in the forward direction or the reverse direction at the playing speed determined in Step S402 or Step S403. The destination of the playing position in Step S405 is preset by the playing position setter 118, for instance, through the setting operation of a hot cue using the performance pads 103A, 103B.

With the above-described function, even when the turntable platter 101 is rotated too much or too little in the second direction, a subsequent playing of the audio data in the forward direction starts from an appropriate position. Specifically, even when the turntable platter is rotated only by 60 degrees in a case where it is necessary to rotate the turntable platter by 90 degrees in order to return to an appropriate playing position, playing of the audio data in the forward direction starts from a playing position where the turntable platter is supposed to be by the rotation by 90 degrees. It becomes eventually necessary to accurately cue in the music piece by manipulating the turntable platter 101. However, at a stage prior to such a final performance, the above-described function enables a user to concentrate on matching the operation timing with the cross fader 102 without becoming conscious about deviation of the rotation amount of the turntable platter 101, thereby enabling efficient practice on scratching.

It should be noted that the playing position controller 117, whose application is not limited to the above-described scratching practice assistance, is optionally used for a so-called beat juggling, where the audio data of the same music piece is imported in both of the A deck and the B deck and the turntable platters 101A, 101B are alternately manipulated. In this case, while switching the playing direction of the first audio data, which is played by the A deck played in response to the operation signal generated by the turntable platter 101A, between the forward direction and the reverse direction, the playing direction switcher 112 switches the playing direction of the second audio data, which is played by the B deck generated in response to the operation signal generated by the turntable platter 101B, between the forward direction and the reverse direction. Further, the playing position controller 117 shifts the playing position of the first audio data to a preset first position when the playing direction of the first audio data played by the A deck is switched from the reverse direction to the forward direction, whereas the playing position controller 117 shifts the playing position of the second audio data played by the B deck to a preset second position when the playing direction of the second audio data is switched from the reverse direction to the forward direction. An accurate cuing of the music piece necessary for the beat juggling can thus be supported.

In the above case, instead of unconditionally shifting the playing position when the playing direction is switched from the reverse direction to the forward direction, the playing position is optionally shifted when, for instance, a difference between the playing position at the end of the reverse play and the playing position of the preset destination is within a predetermined range. Alternatively, a plurality of playing positions are optionally preset as the destination and one of the playing positions for the destination closest to the playing position at the end of the reverse play is optionally selected.

The above-described embodiment of the invention is merely exemplary and various modifications are possible. For instance, the audio data processing device, which is exemplified by the DJ controller in the above-described exemplary embodiment, is optionally some other DJ instruments (e.g. a mixer and all-in-one DJ system such as digital audio player with communication and mixing functions) in order to achieve the same function. The above function is optionally implemented by DJ application software on a terminal device (e.g. PC and smartphone). In the above cases, the audio data processing device itself is not necessarily provided with an operator such as the turntable platter and the cross fader. For instance, the audio data processing device may receive the operation signal from an operator provided on an external device such as a turntable provided on a Digital Vinyl System (DVS). The above function is optionally at least partially implemented in a server configured to send the audio data to a terminal device through a network, where the server serves as the audio data processing device.

Preferred exemplary embodiments of the invention have been described above in detail with reference to the accompanying drawings, but the invention is not limited to these exemplary embodiments. It is apparent that a person having ordinary skill in the art of the invention can arrive at various alterations and modifications within the scope of the technical idea defined by the appended claims, and it is understood that such alterations and modifications naturally fall within the technical scope of the invention.

EXPLANATION OF CODES

100 ... DJ controller, 101, 101A, 101B ... turntable platter, 102 ... cross fader, 103A, 103B ... performance pad, 104 ... effect adjustment knob, 105 ... effect activation button, 106A, 106B ... channel fader, 110 ... audio data processing function, 111 ... player, 112 ... playing direction switcher, 113 ... playing speed controller, 114 ... play effect selector, 115 ... playing sound volume controller, 116 ... time interval calculator, 117 ... playing position controller, 118 ... playing position setter, 119 ... threshold determiner

The invention claimed is:

1. An audio data processing device comprising:
a player configured to play audio data;
a playing sound volume controller configured to control a playing sound volume of the audio data in response to an operation signal;
a time interval calculator configured to calculate a time interval of occurrences of a predetermined event in the operation signal; and
a playing position controller configured to shift a playing position of the audio data to a predetermined position when the time interval is more than a threshold and configured to continue playing the audio data without shifting the playing position of the audio data when the time interval is not more than the threshold.

2. The audio data processing device according to claim 1, wherein the predetermined event comprises acquisition of the operation signal for increasing the playing sound volume from 0.

3. The audio data processing device according to claim 1, wherein
the player plays a first audio data and a second audio data in a mutually independent manner,
the playing sound volume controller is configured to cross-fade the playing sound volume of the first and second audio data in response to the operation signal,
the predetermined event comprises acquisition of a predetermined operation signal for the first audio data, and
the audio data processing device further comprises a threshold determiner configured to determine the threshold depending on a BPM of a music piece played based on the second audio data.

4. The audio data processing device according to claim 1, further comprising a playing position setter configured to set the predetermined position.

5. An audio data processing method comprising:
playing audio data;
controlling a playing sound volume of the audio data in response to an operation signal;
calculating a time interval of occurrences of a predetermined event in the operation signal; and
shifting a playing position of the audio data to a predetermined position when the time interval is more than a threshold and continuing playing the audio data without shifting the playing position of the audio data when the time interval is not more than the threshold.

6. A non-transitory tangible storage medium storing a program causing a computer to perform:
a function for playing audio data;
a function for controlling a playing sound volume of the audio data in response to an operation signal;
a function for calculating a time interval of occurrences of a predetermined event in the operation signal; and
a function for shifting a playing position of the audio data to a predetermined position when the time interval is more than a threshold and continuing playing the audio data without shifting the playing position of the audio data when the time interval is not more than the threshold.

* * * * *